United States Patent [19]

Keller

[11] 4,061,059

[45] Dec. 6, 1977

[54] UNDERCUTTER ATTACHMENT

[75] Inventor: Dale L. Keller, Gettysburg, Pa.

[73] Assignee: Richard H. Sheppard, Hanover, Pa.

[21] Appl. No.: 667,798

[22] Filed: Mar. 17, 1976

[51] Int. Cl.$^2$ .......................... B23B 1/00; B23B 5/00
[52] U.S. Cl. .................................. 82/1 C; 82/11; 82/24 A; 29/57
[58] Field of Search .............. 82/11, 24 A, 24 R, 1 C, 82/5, DIG. 3; 29/57

[56] References Cited

U.S. PATENT DOCUMENTS

| | | | |
|---|---|---|---|
| 1,678,924 | 7/1928 | Strindberg | 29/57 A |
| 2,002,933 | 5/1935 | Buell | 82/24 A |
| 2,097,096 | 10/1937 | Groene | 82/24 A |
| 2,396,631 | 3/1946 | Andresen | 82/5 X |
| 2,799,076 | 7/1957 | Rice | 29/57 |
| 3,643,531 | 2/1972 | Burke et al. | 82/24 A |

*Primary Examiner*—Leonidas Vlachos

[57] ABSTRACT

A device for undercutting a rotating workpiece is provided wherein the tool carried by the toolholder is actuated into and out of engagement with the workpiece at predetermined feed locations. A base forms the mounting for the undercutter attachment with the toolholder being pivotally mounted on said base. The tool is moved axially in one direction along the workpiece to provide cutting. When the end of the travel has been reached, the tool moves in the opposite or return direction and the tool is automatically disengaged prior to reaching the start of the undercut portion. The actuator for the tool includes a pivoted arm and stationary trip cam on the machine tool. A positive latch holds the tool in the cutting position and a release trigger engages the trip cam to release the latch during the return feed at the proper position. The latch comprises a biased pin and the pivotal toolholder is biased by a spring activated cylinder. The trip cam includes a button having a spring with sufficient strength to overcome the countering forces of the cylinder and the latching pin to assure proper actuation of the tool. The method includes the steps of maintaining the tool out of the path of the workpiece, moving the tool into undercut working engagement, continuing to feed the tool to provide an extended undercut, returning the tool, and disengaging the tool during the return feeding.

10 Claims, 6 Drawing Figures

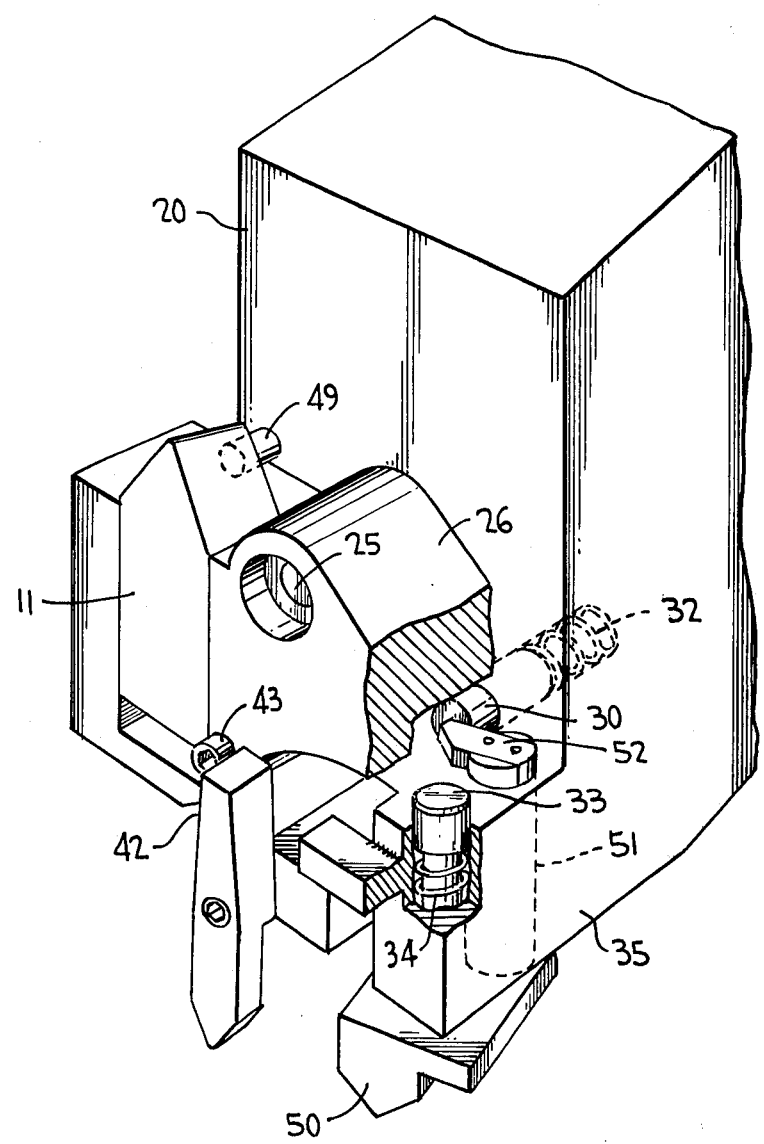

UNDERCUTTER ATTACHMENT

BACKGROUND OF THE INVENTION

The present invention relates to automatic machine tools, and more particularly, to an undercutter attachment for an automatic lathe.

In machine shop operations, the maximum utilization of an automatic machine tool is a goal that is being continuously sought. One machine tool can be very useful to a manufacturing operation if that machine tool can efficiently manufacture several different parts, such as parts that are similar but of different dimensions. For this purpose, there have in the past been provided numerous adjustments and attachments for machine tools to give the manufacturer of metal products the maximum use of a machine tool.

One of the best known approaches in extending the usefulness of a machine tool, such as a lathe, is to provide a turret having a plurality of toolholders that are programmed to engage the rotating workpiece at different times during the machining sequence. As machining operations become more and more complex and intricate, it has become the usual thing for every tool position on the turret to be occupied to perform a function during a sequence. If the piece is not completely machined by the time all of the tool stations are expended, then the tool must be run through a second sequence of operations on the same or a different machine tool, which adds considerably to the cost of manufacture of the part.

In addition to the turret mounted tools, modern day automatic machine tools have additional toolholders mounted on cross slides. These additional tools are designed to perform minor machining operations. The tools mounted on the cross slides can perform undercutting operations that heretofore the tools mounted on the turret stations could not.

An undercutting operation is where a portion of the workpiece adjacent the holding chuck is machined to a diameter less than another diameter toward the distal end of the tool. In other words, a cut is made with a larger diameter section between the end of the workpiece and the position of the cut.

The cross slide is ideal for this type of operation since the cross slide can move the tool radially directly into the workpiece when the workpiece has reached the position for starting, as previously programmed. However, there has existed a definite disadvantage in that the cross slides do not move along the workpiece in the axial direction, but instead are stationary. Thus the width of the undercut made by the tools on the cross slides is limited to the width of the tool itself.

When an extended undercut is made, the prior solution on the usual machine tool was to simply use several cutting operations performed by the cross slides. This is a very slow and tedious process, and thus time consuming and costly to the manufacturing operation. Also, the tendency is to employ a tool that is too wide, thereby causing chatter of the tool and an inferior machined surface.

In the prior art, the Bechler U.S. Pat. No. 3,308,693, issued Mar. 14, 1967, is exemplary of the type of approach that has been taken in attempts to extend the capability of an automatic lathe. In this prior art, the tools are mounted on slides that extend into and out of engagement with the work and perform a single location cutting operation. A pair of tools is taught mounted on a single cross slide, but the extent along the length of the workpiece that can be cut by a single tool is limited to the width of the tool. If more cutting is needed, it appears that the answer in the Bechler patent is simply to provide more than one tool mounted on each cross slide at different axial locations.

A different approach is shown in the patent to Poorman, U.S. Pat. No. 3,062,080 in which an undercutting tool is mounted on one station of a turret toolholder. In this arrangement, the length of the undercut that can be made is still limited to the width of the tool that is employed.

Thus, I found it to be desirable to invent an apparatus and method for performing an undercutting operation that is not limited to the width of the tool. I employ a conventional narrow, pointed tool and feeding of the tool relative to the workpiece. The tool is tripped into and out of engagement at the appropriate points along the workpiece. The advantages are: (1) elimination of several tools needed for a single undercutting job; (2) the elimination of chatter and poorly machined parts due to the selection of a tool that is too wide; (3) elimination of the need for several machining sequences to provide one extended undercut portion; and (4) freeing up of the turret stations and cross slides for other machining operations that may be necessary on the workpiece.

OBJECTIVES OF THE INVENTION

Thus, one basic object of the present invention is to provide an undercutter attachment for a machine tool that is capable of selective actuation and cutting of an extended length undercut.

Another object of the present invention is to provide an undercutter attachment that can be easily adapted to automatic machine tools and greatly extend the usefulness of that machine tool.

It is still another object of the present invention to provide an undercutting device and method that allows maximum utilization of all of the working tools of the machine at the lowest cost possible.

It is another object of the present invention to provide a machine tool in which the versatility has been significantly enlarged without providing additional turret stations or cross slides and without mounting two tools on a single toolholder.

BRIEF DESCRIPTION OF THE INVENTION

The present invention envisions a novel undercutter attachment for a machine tool comprising a base, feed means for providing relative movement between the base and the workpiece, a movable toolholder that is carried by the base, a tool on the toolholder, and actuator means for automatically engaging the tool only upon reaching a predetermined position along the feed of the tool. The undercut with the present attachment can be started at any point during the feeding operation of the tool and continues until the machine is programmed to start the return feed. The tool is advantageously retracted just prior to reaching the starting point of the original cutting operation. This retraction allows the tool to move over the top of the unmachined portion, thus naturally leaving the undercut section spaced from the distal end of the workpiece.

As an example of one machine tool upon which one form of my undercutter can be used, the Warner and Swasey machine, Model 2AB, manufactured by the Warner and Swasey Company, Cleveland, Ohio, is of interest. This automatic lathe provides a turret hub with dovetail slots for mounting toolholders along the outwardly extending faces of the hub. The base of the undercutter attachment, according to the present invention, is mounted directly in the dovetail slot of this turret hub.

The pivotal toolholder is operated by actuator means that may take the form of a pivotal arm designed to cam the toolholder to bring the tool against the workpiece and to the desired cutting depth. The actuating arm preferably engages a stationary trip cam means mounted on the machine such that the engagement is automatically made at the right time when the distance along the tool has been reached to commence the undercut.

An additional feature is the latching means for holding the toolholder in the proper cutting position to give the proper cutting depth. The latch preferably comprises a spring loaded pin that engages a recess in the pivoted toolholder when the arm has brought the toolholder to the proper cutting depth.

The actuator means also includes a release trigger assembly that is powered by the stationary trip cam on the return stroke. The release is accomplished by depressing the latching pin, allowing the pivoted toolholder to slide back over the pin face. The toolholder is normally urged in the direction away from the workpiece by a biasing cylinder or plunger.

The trip cam means includes a spring loaded actuating button. The spring limits the amount of force that can be applied to both the activating arm and the release trigger assembly. This spring has sufficient strength to overcome the countering forces of the biasing cylinder and the latching pin. At the same time, these parts are allowed to move past each other after trip during the continued feed of the tool relative to the workpiece.

Since the undercutter attachment is mounted on the hub of the turret, another tool may be mounted at the distal end along the same dovetail mounting slot. In the embodiment shown, this additional tool takes the form of a drill to provide the end of the workpiece with a bore. By using more than one tool at this work station, one tool being an undercutting tool mounted on the undercutter attachment of the present invention, the capability of the machine tool is enhanced.

The undercutter attachment is shown in the drawings as operating on a shaft suitable for an output shaft of a power steering gear. The undercut portion on that shaft can be made during the machining process of the end that carries the enlarged splined section, that for example, may be the section for mounting of the output gear. The undercut section of the shaft may be required to be only a short distance, as depicted in the drawings of the present invention, or it may be more extended as the length of the shaft is increased.

In the case of long shafts, with my inventive device and method the workpiece can now for the first time be completely machined in two machining operations by this simple two step (turning the workpiece end-for-end) operation. The undercut portion of the shaft when added to the portion machined when the opposite end is being machined provides the complete shaft in finished form. Heretofore, additional machining operations or a machine tool with a longer feed was required to machine the longer versions of the output shaft. My attachment has rendered the need for more operations and/or larger and more costly machines obsolete.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 6 is a cutaway perspective view of the undercutter attachment with the tool latched in position in the cutting position.

DETAILED DESCRIPTION OF THE PREFERRED EMBODIMENT

Figure 1:
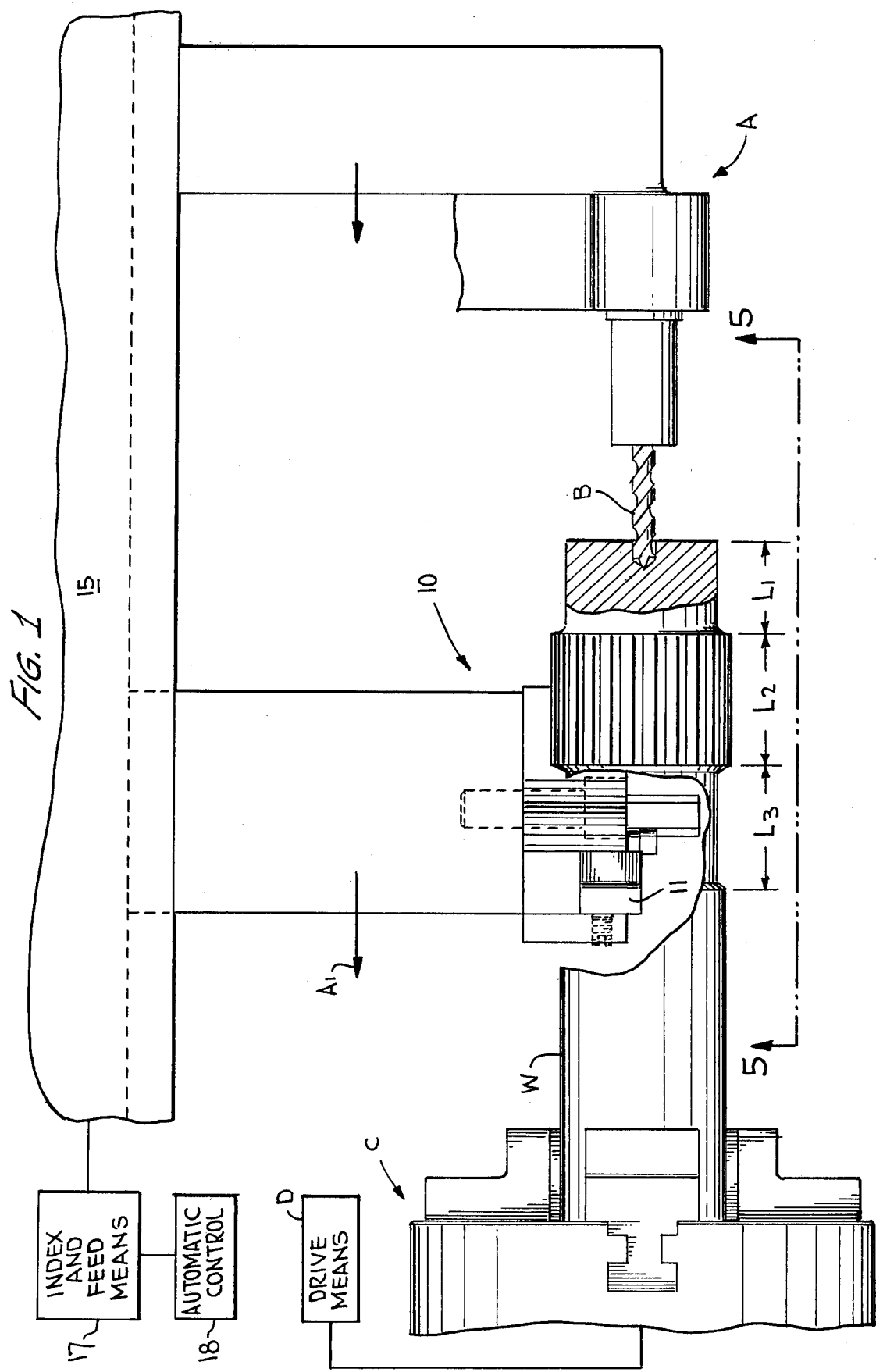
FIG. 1 is a cutaway side view of a machine tool with the undercutter attachment of the present invention mounted in working relationship with respect to the workpiece and the working turret.
Figure 2:
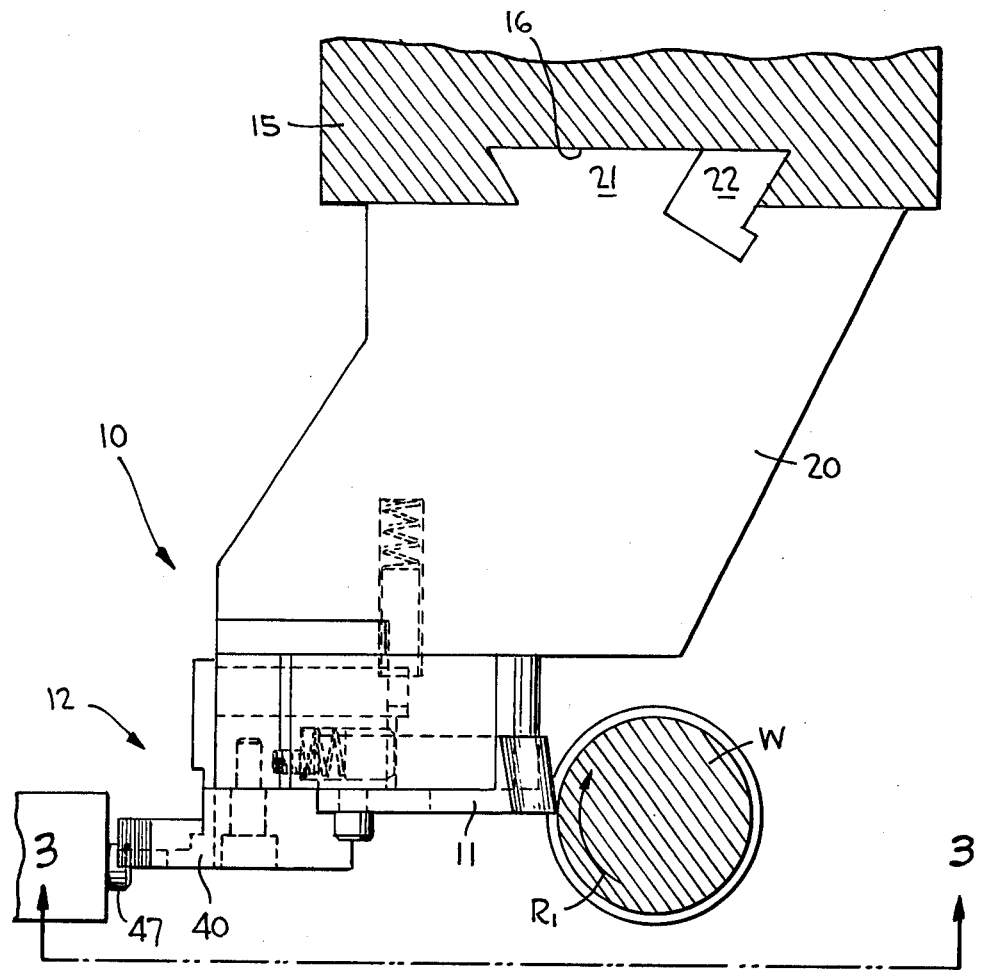
FIG. 2 is an end view with the workpiece in cross-section showing the tool providing an undercut in the workpiece.
Figure 3:
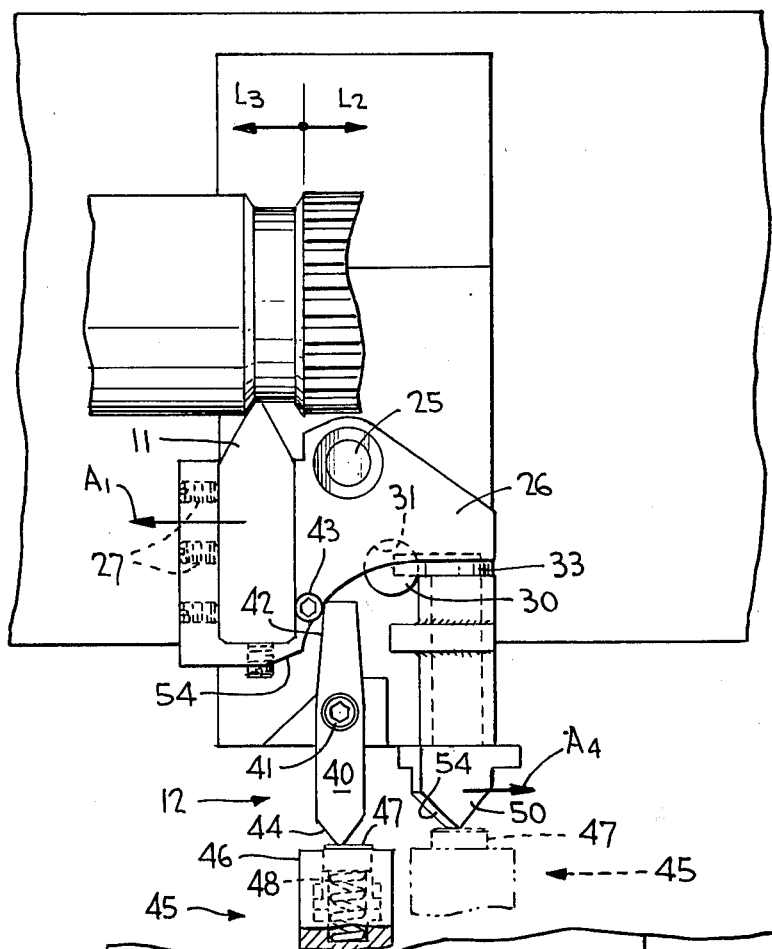
FIG. 3 is a bottom view of the undercutter attachment showing the workpiece being undercut to the desired depth by the tool that has been actuated into cutting position.

The nature of my invention can be more fully understood by specific reference to the drawings and noting the specific parts and components of a preferred embodiment that has been actually reduced to practice. FIGS. 1-3 are sufficient to gain the fuller understanding of the broad concepts of my invention. A workpiece W is mounted in a machine tool chuck C and is rotated by conventional drive means D. The undercutter attachment, generally represented by the reference numeral 10 employs a tool 11 to work against the rotating workpiece and provide the cut. In accordance with the invention, and as will be seen more clearly in detail as the description proceeds, an actuator means 12 is operative to engage the tool and hold the tool in cutting position over an extended length of feed movement in response to one direction of relative feed movement and disengage the tool in response to return feed in the opposite direction. An automatic lathe can be easily converted by my attachment for undercutting over an extended, selected length of a workpiece without any modification of the machine and with minimum conversion time.

The automatic lathe upon which the preferred undercutter attachment 10 may be attached includes a central tool mounting hub 15 having a plurality of outwardly facing elongated surfaces with longitudinal dovetail slots 16 (see FIG. 2). Within these slots, may be positioned a plurality of cutting tools, such as the axial drill assembly A, shown in FIG. 1.

Hub 15 is connected to an index and feed means 17 that is a part of the automatic lathe, which in turn is controlled by a conventional automatic tape control 18. As is well known in the art, the hub 15 is first indexed to bring each tool assembly, such as the axial drill A, into position to operate on the workpiece W. Then, the hub 15 is moved axially in order to provide the relative feed movement between the workpiece W and the tool.

The prior art tools mounted on the turret must by design always begin work from the distal end of the workpiece W since the indexing must be accomplished before the tool comes in engagement with the workpiece. Prior to the present invention, there was no provision for bringing a tool mounted on the turret assembly into engagement with the workpiece for extended cutting except in a position that had already been machined and then moving the tool along the workpiece so as to gradually bring the tool against the larger diameter stock to be machined. In other words, there was no provision in the prior art for providing an extended undercut on the workpiece when using a turret mounted tool, and this necessitated using the cross slides and/or wide tools for such an operation.

As noted above, the workpiece shown in the preferred embodiment may be, for example, the output shaft of a power steering gear. The length portion $L_1$ has already been machined at a previous position of the turret assembly. The second section $L_2$, is of larger diameter and in the specific instance shown is the splined section for mounting the output shaft of the steering gear. Then, length $L_3$ is the section that must be undercut on the shaft in order that when the shaft is removed from the chuck C and turned end-for-end for the final machining operation, it is assured that the entire length of the shaft can be machined.

In the axial drill assembly A, the drill bit B can be employed during the same work position of the turret assembly so that two machining operations are actually accomplished where one previously had been the norm.

When the tool 11 reaches the final position of cutting, that is along the lefthand shoulder of the length $L_3$, and with the axial bore completed, the automatic control 18 reverses the feed means 17 to provide the return feed toward the distal end of the workpiece W. The tool 11 is disengaged in response to this return feeding, as will be explained later.

It should be understood that with the undercutting attachment 10 of the present invention, the length of cut $L_3$ can be of any desired length, controlled by the automatic feed control of the machine. This is in contrast to the prior art procedures of using a cross slide with a wide tool to provide undercutting of workpieces. Thus, the length $L_3$ could in practice extend all the way up to the position of the workpiece W adjacent the chuck C. Substantially, the full length of the normal feed movement could theoretically be used for an undercutting operation. With my invention, the use of wide tools with the attendant problem of chatter and poor machining quality has been eliminated. The undercutting operation is performed with the most efficient narrow point cutting tool 11 for a smooth, high quality cut. Depending on the material used, the feed means 17 can be set as desired and one tool can be used for any length cut $L_3$.

With reference now to FIG. 2, the undercutter attachment 10 can be seen to comprise for mounting purposes, a base block 20 having a dovetail mounting 21 and matching wedge 22 to hold the attachment 10 securely on the turret hub 15. As viewed in FIG. 2, the workpiece W may be rotated in the clockwise direction (note arrow $R_1$) with the tool 11 pointing downwardly and positioned to the rear of the workpiece.

On the lower face of the base block 20, a pivot pin 25 mounts pivotal toolholder 26, which in turn, is holding tool 11 by a plurality of set screws 27 (see bottom view, FIG. 3). In FIG. 3, the tool 11 is shown in the cutting position with the undercut operation in process. In this position, the toolholder 26 is latched or locked in position by a mechanism that will now be described.

Figure 4:
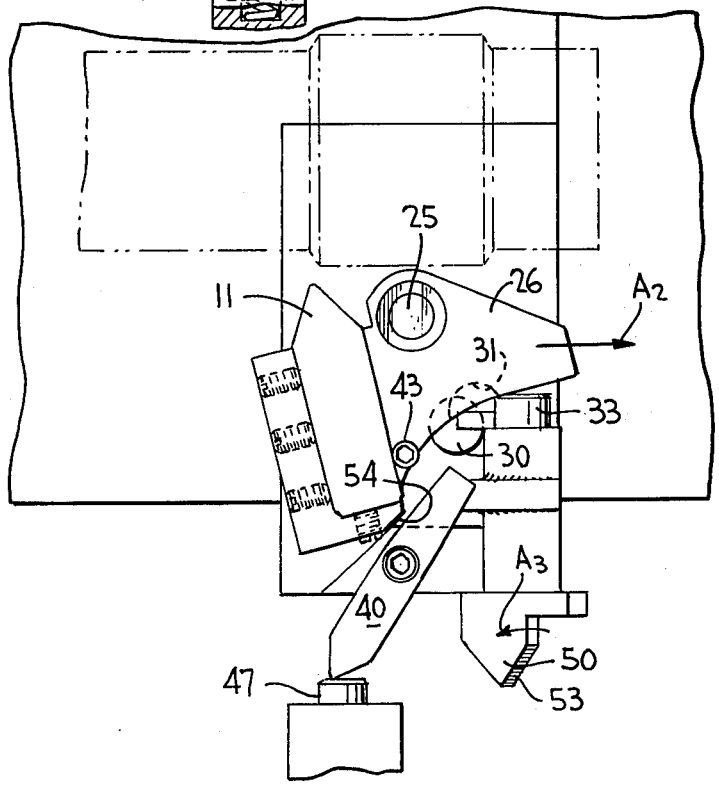
FIG. 4 is a view like FIG. 3 but the tool having been released during the return feed.

Latching pin 30 is slidably mounted in a bore formed in the bottom face of the base block. In FIG. 3, the latching pin 30 is shown in its extended position where it is engaging a mating recess 31 in the adjacent face of the pivotal toolholder 26. With the latching pin 30 depressed against the force of its biasing spring 32 (compare FIGS. 4 and 6) it moves out of the recess 31 allowing the toolholder 26 to pivot, as shown in FIG. 4. The toolholder 26 is continuously biased to the disengaged position by plunger 33 that has spring 34 held captive in a hole formed in a leg 35 of the base block 20 (see FIG. 6).

The actuator means, which engages and disengages the tool 11 by feed movement of the toolholder 26 in a novel manner, and forming an important part of the present invention, will now be described. Pivotal tool actuating arm 40 is carried by a pivot shaft 41, which is parallel to the pivot pin 25 for the toolholder 26. One end of the arm 40 provides a cam surface 42 (see FIGS. 3 and 6) acting against a cam follower pin 43 on the toolholder 26. The opposite end of the arm 40 carries cam surface 44 that engages the stationary trip cam assembly 45.

The trip cam assembly 45, that forms an integral and important part of the actuator means that allows the toolholder 26 to be automatically engaged and disengaged in response to relative feed movement, comprises a block 46 that is mounted on the stationary frame of the machine tool. A cam button 47 is carried by the block 46 facing the cam surface 44 of the arm 40. The button 47 is depressable within its bore against the force of its biasing spring 48.

The strength of the spring 48 is chosen in accordance with the invention to be greater than the spring 34 that it must counteract. This gauging of the relative strengths of the springs is done of course while taking into account the frictional resistance of the camming surfaces 42, 44, the sliding resistances of the button and plunger 33, 47, respectively, and the resistance of the pivot points at 25 and 41. In the final analysis, the adjusted strength of the spring 48 must be sufficient to overcome the adjusted counteracting force of the spring 34 in order to assure actuation of the tool 11.

A limit stop pin 49 (FIG. 6) may be provided to limit the inward cutting position of the tool 11. When the toolholder 26 engages the stop pin 49, the latching pin 30 is aligned with the notch 31 and snaps into locked position. When this occurs, the arm 40 cannot rotate in either direction. The cam face 44 is then locked solid and simply proceeds to depress the button 47 against the greater force of the spring 48. As the attachment 10 proceeds to move in accordance with feed arrow $A_1$ in FIG. 3, the button 47 is eventually cleared and pops out in readiness for the disengaging function that it performs on the return movement.

Disengagement is accomplished by a release trigger assembly including a trigger 50, a connecting shaft 51 and an operating cam 52. The cam 52 rests against the top of the latching pin 30 and when the assembly is rotated to push the cam against the pin, the pin will be depressed into its bore and out of the recess 31 whereby the toolholder 26 is released and withdrawn, as shown in FIG. 4.

The release of the pin 30 and thus the disengagement of the toolholder 26 occurs as the attachment is being returned by the feed means 17 after completing its cutting operation. Cam face 53 on the trigger 50 is designed to engage the button 47, in a manner similar to that described with respect to the surface 44 on the arm 40. Thus, as the attachment is moving in the return direction of arrow $A_2$ in FIG. 4, the trigger 50 rotates in the direction of arrow $A_3$, thereby rotating the shaft 51 and camming the pin 30 down into its bore as described. The force of the spring and biasing plunger 33 retracts the tool 11 once the pin 30 has been depressed.

Again, it is important to have the adjusted force of the spring 48 greater than the countering force of the spring 32 in order to assure operation of the release trigger assembly. As before, the friction between the parts is taken into account when figuring the forces necessary for the two springs.

Of course, during the cutting feed movement $A_1$ the trigger 50 must have provision for going past the button 47. This is accomplished by allowing the entire release trigger assembly to pivot in the direction of the arrow $A_4$ (FIG. 3) as the cam surface 54 engages the button 47. In order to depict this condition in FIG. 3, a dotted line outline of the trip cam means 45 has been illustrated. It is to be understood that the cam 52 (FIG. 6) has sufficient clearance within a cut-out of the toolholder 26 to lift free of the latching pin 30 as the trigger 50 moves clear of the button 47.

In FIG. 4, the button 47 has already served to disengage the tool 11 and it can be seen that the arm 40 is similarly free to pivot away from the cam follower 43 in the return direction depicted by arrow $A_2$. The toolholder is held by its stop surface 54 against the mounting member for the pin 41 (see FIG. 4).

Thus to briefly review the operation of the undercutter attachment and to give further meaning to the method of the present invention, the index and feed means 17 is first assumed to have positioned the attachment 10 in readiness to commence the cutting operation. The feed of the hub 15 in the direction of arrow $A_1$ moves the attachment 10 until the point of the tool 11 is just opposite the righthand end of the length $L_3$. It will be realized that in FIG. 1, the tool 11 has already completed the cut, as will more fully appear below. Also, it will be realized that the lengths $L_1$ and $L_2$ have already had machining operations performed at other rotary positions of the turret assembly.

Figure 5:
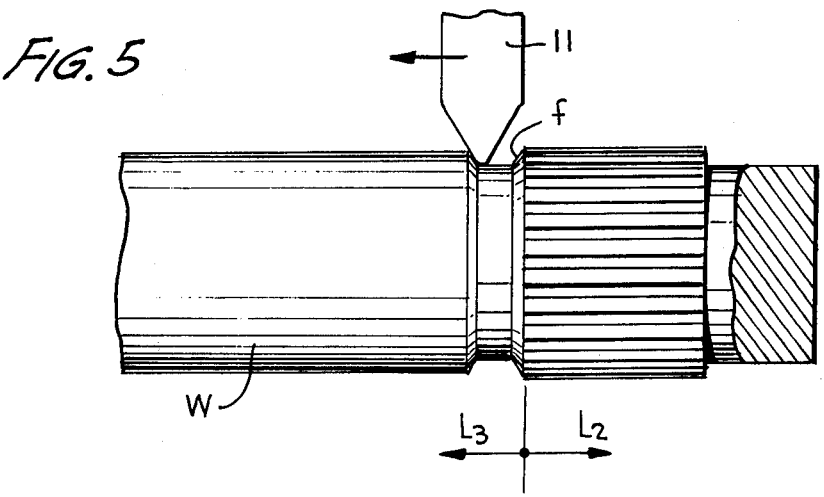
FIG. 5 is a simplified showing of the workpiece and the tool with the cut being made and the fillet machined at the start of the undercut.

Thus with the point of the tool 11 at the beginning shoulder for providing the undercut, the cam surface 44 (see FIG. 3) engages the button 47 and through the cam follower 43 moves the toolholder 26 to bring the tool into cutting engagement. As the cutting engagement is being accomplished, the shoulder is automatically formed in the shape of a rounded fillet f, as is desirable (see FIG. 5). The inner limit of the shoulder is formed when the tool 11 has finally moved to the full inward position, which is determined by the limit stop 49 and the pin 30 latched within the recess 31.

It is important to note that up until the button 47 is engaged, the tool 11 is maintained out of the path of the workpiece to avoid cutting over the length $L_2$ of the workpiece. The inward movement of the tool 11 is also desirably responsive to the feed movement and with the workpiece properly positioned in the chuck C the shoulder between the lengths $L_2$, $L_3$ is accurately positioned on each workpiece.

As shown in FIG. 3, the feed of the work continues along the length $L_3$ (see also FIG. 5) until the full length $L_3$ desired has been machined (see FIG. 1). At the lefthand shoulder of the extended cut $L_3$ in the workpiece, the automatic control of the machine 18 has been programmed to reverse the feed means 17 thus moving the turret assembly and hub 15 with the attachment 10 carried thereby in the reverse direction.

Just before the tool has returned to the righthand shoulder of the cut $L_3$, the cam face 53 of the trigger 50 comes into engagement with the upstanding button 47 on the trip cam means 45. When this occurs, the rotation of the trigger assembly in the direction of arrow $A_3$ causes the pin 30 to be depressed into its bore, and by the force of the biasing plunger 33, the toolholder 26 is pivoted and the tool 11 is retracted.

As can be seen in FIG. 4, the trigger 50 has moved across the button 47 in ample time for the tool 11 to then move clear across the length $L_2$. When the return movement has been accomplished, the turret is indexed to the next work position and the next work operation is ready to begin.

In summary, it can be seen that the device and method of my invention provides a system for undercutting a rotating workpiece so as to provide an extended cut without having to use a cross slide and wide face tool or separate machining operations. The undercut is accomplished by my attachment mounted on the turret assembly and can even occur concurrently with another operation. By selective positioning of the trip cam means 45, the undercut portion $L_3$ can be started at any desired position along the length of the workpiece. Once the starting position has been determined, the tool is always disengaged on the programmed return feed at the proper position.

The toolholder is sturdy in construction to provide a solid mounting for the tool. The actuation of the tool does not require any outside force since it is performed solely in response to the relative feed movement between the undercutter attachment and the workpiece.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

What is claimed is:

1. An undercutter attachment for a machine tool for operating on a rotating workpiece in forming an undercut portion upon said workpiece relative to an enlarged diameter portion of said workpiece, comprising:
   a base,
   feed means for providing relative movement between said base and said workpiece,
   a movable toolholder mounted on said base,
   a tool carried by said toolholder for cutting said workpiece, and
   actuator means for engaging said tool at a predetermined position in response to one direction of feed movement, moving said tool in a single step from an inoperative position which is clear of said enlarged diameter portion of said workpiece to an operative undercutting position, holding said tool in said undercutting position over an extended length of feed movement, and disengaging said tool in a single step from said operative undercutting position to said inoperative position clear of said enlarged diameter portion of said workpiece in response to return feeding in the opposite direction.

2. The undercutter attachment of claim 1 wherein said toolholder is pivotally mounted on a pivot pin.

3. The undercutter attachment of claim 2 wherein said actuator means comprises a pivotally mounted activating arm, a cam surface on said arm, a follower on said pivot toolholder and stationary cam power means on said machine tool for moving said activating arm to in turn actuate said tool.

4. The undercutter attachment of claim 3 wherein said toolholder and said activating arm are mounted for pivotal movement about parallel axes normal to the axis of said workpiece.

5. An undercutter attachment for a machine tool for operating on a rotating workpiece comprising:
a base;
feed means for providing relative movement between said base and said workpiece;
a movable toolholder pivotally mounted on said base by means of a pivot pin;
a tool carried by said toolholder for cutting said workpiece;
actuator means for engaging said tool in the cutting position in response to one direction of feed movement and holding said tool in said cutting position over an extending length of feed movement and disengaging said tool in response to return feeding in the opposite direction;
said actuator means comprises a pivotally mounted activating arm, a cam surface on said arm, a follower on said pivotal toolholder, and stationary cam power means on said machine tool for moving said activating arm to in turn actuate said tool, said toolholder and said activating arm being mounted for pivotal movement about parallel axes normal to the axis of said workpiece; and
positive latching means for securely fixing said tool in the cutting position, said actuator means including release trigger means for disengaging said latching means, said trigger means being movable in response to said cam power means.

6. The undercutter attachment of claim 5 wherein said latching means includes a pin, a recess in said toolholder to receive said pin to hold said tool in the cutting position and a spring for urging said pin into said recess.

7. The undercutter attachment of claim 6 wherein said release trigger means pushes said latching pin to move the same out of said recess in response to engagement with said cam power means.

8. The undercutter attachment of claim 7 wherein is provided a biasing cylinder for moving said toolholder during disengagement from the cutting position and a spring for said cylinder.

9. The undercutter attachment of claim 8 wherein said cam power means includes a button mounted on a stationary block in said machine tool, spring means for biasing said button toward said activating arm and said release trigger means, said spring means having sufficient strength to overcome the countering forces of said biasing cylinder spring and said latching pin spring to assure proper actuation of said tool.

10. The method of undercutting a rotating workpiece on a machine tool in order to form an undercut portion upon said workpiece relative to an enlarged diameter portion of said workpiece comprising the steps of:
relatively feeding in one direction a cutting tool axially with respect to said workpiece,
maintaining said tool at an inoperative position out of the path of said workpiece so as to avoid cutting over an enlarged diameter length of said workpiece,
moving said tool in a single step from said inoperative position to an operative undercutting position against said workpiece after passing said enlarged diameter length in response to said movement,
continuing to feed said tool relative to said workpiece so as to provide an extended undercut,
relatively return feeding said workpiece and said tool in the opposite direction, and
disengaging said tool in a single step from said operative undercutting position to said inoperative position during return feeding in response to said movement.

* * * * *